United States Patent
Harris et al.

(10) Patent No.: US 11,709,947 B2
(45) Date of Patent: *Jul. 25, 2023

(54) MULTI-PARTY ENCRYPTION CUBE PROCESSING APPARATUSES, METHODS AND SYSTEMS

(71) Applicant: VISA INTERNATIONAL SERVICE ASSOCIATION, San Francisco, CA (US)

(72) Inventors: Theodore Harris, Foster City, CA (US); Scott Edington, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 17/128,390

(22) Filed: Dec. 21, 2020

(65) Prior Publication Data

US 2021/0150039 A1    May 20, 2021

Related U.S. Application Data

(63) Continuation of application No. 16/439,431, filed on Jun. 12, 2019, now Pat. No. 10,902,134, which is a
(Continued)

(51) Int. Cl.
*H04L 29/06* (2006.01)
*G06F 21/60* (2013.01)
(Continued)

(52) U.S. Cl.
CPC ........ *G06F 21/602* (2013.01); *G06F 21/6245* (2013.01); *G06Q 20/3823* (2013.01);
(Continued)

(58) Field of Classification Search
CPC .............. G06F 21/602; G06F 21/6245; G06Q 20/3823; G06Q 40/00; H04L 9/008
See application file for complete search history.

(56) References Cited

U.S. PATENT DOCUMENTS 6,285,983 B1    9/2001  Jenkins
6,327,574 B1   12/2001  Kramer
(Continued)

FOREIGN PATENT DOCUMENTS

CN    101981889 A    2/2011
CN    103392178      11/2013

OTHER PUBLICATIONS

Australian Examination Report No. 1 for App. No. AU2016219159, dated Jul. 15, 2020, 4 pages.
(Continued)

*Primary Examiner* — Shin-Hon (Eric) Chen
(74) *Attorney, Agent, or Firm* — K&L Gates LLP

(57) ABSTRACT

Computer-implemented systems and methods are disclosed herein for use within secure multi-party computation. A system and method are used for storing an operation preference and a cryptographic preference. A data set is stored based on the operation preference and the cryptographic preference. A determination is made that processing the query involves performing an allowable operation on the data set based on the operation preference.

18 Claims, 8 Drawing Sheets

Related U.S. Application Data continuation of application No. 16/215,975, filed on Dec. 11, 2018, now Pat. No. 10,366,239, which is a continuation of application No. 15/864,835, filed on Jan. 8, 2018, now Pat. No. 10,157,284, which is a continuation of application No. 15/042,405, filed on Feb. 12, 2016, now Pat. No. 9,898,612.

(60) Provisional application No. 62/115,178, filed on Feb. 12, 2015.

(51) Int. Cl.

| | | |
|---|---|---|
| *G06F 21/62* | (2013.01) | |
| *G06Q 20/38* | (2012.01) | |
| *G06Q 40/00* | (2023.01) | |
| *H04L 9/00* | (2022.01) | |
| *H04W 12/02* | (2009.01) | |
| *H04W 12/033* | (2021.01) | |

(52) U.S. Cl.
CPC .............. *G06Q 40/00* (2013.01); *H04L 9/008* (2013.01); *H04W 12/02* (2013.01); *H04W 12/033* (2021.01)

(56) References Cited

U.S. PATENT DOCUMENTS

| | | | |
|---|---|---|---|
| 6,366,915 B1* | 4/2002 | Rubert .................... | G06F 16/25 707/999.009 |
| 8,539,597 B2 | 9/2013 | Arasaratnam | |
| 8,732,856 B2* | 5/2014 | Sack ................... | G06F 21/6227 726/30 |
| 9,898,612 B2 | 2/2018 | Harris | |
| 10,157,284 B2 | 12/2018 | Harris | |
| 10,366,239 B2 | 7/2019 | Harris | |
| 10,902,134 B2 | 1/2021 | Harris | |
| 2002/0087967 A1 | 7/2002 | Conkwright | |
| 2004/0068661 A1* | 4/2004 | Dettinger ............ | G06F 21/6227 726/1 |
| 2007/0250904 A1* | 10/2007 | Waller ................ | H04L 63/0435 726/1 |
| 2008/0010233 A1* | 1/2008 | Sack ................... | G06F 21/6227 |
| 2009/0024566 A1* | 1/2009 | Wong .................. | G06F 21/6227 |
| 2009/0245518 A1* | 10/2009 | Bae ....................... | H04L 63/065 713/161 |
| 2010/0036884 A1* | 2/2010 | Brown .................. | G06Q 30/00 707/771 |
| 2010/0257372 A1* | 10/2010 | Seifert ................ | G06F 21/6218 713/189 |
| 2010/0312785 A1* | 12/2010 | Kliewe ............. | G06F 16/24547 707/769 |
| 2011/0022883 A1 | 1/2011 | Hansen | |
| 2013/0159021 A1* | 6/2013 | Felsher .................. | G16H 10/60 705/3 |
| 2013/0246813 A1* | 9/2013 | Mori ....................... | H04L 9/008 713/193 |
| 2013/0275752 A1 | 10/2013 | Zhang | |
| 2014/0237231 A1* | 8/2014 | Spalka .................... | G06F 21/34 713/165 |
| 2014/0281512 A1* | 9/2014 | Arasu ................... | G06F 21/602 713/165 |
| 2014/0351104 A1 | 11/2014 | Abbe | |
| 2015/0263859 A1* | 9/2015 | Lietz ................... | H04L 63/0281 713/168 |
| 2017/0237719 A1* | 8/2017 | Schwartz ............ | H04L 63/0485 713/153 |

OTHER PUBLICATIONS

Chinese Office Action (with English language translation) for Application No. 201680009926.4, dated Mar. 22, 2019, 8 pages.

CN Office Action for CN2016800099264, dated Apr. 13, 2018, 6 pages.

Corrected Notice of Allowance dated Sep. 23, 2020 for U.S. Appl. No. 16/439,431 (pp. 1-5).

European Extended Search Report dated Jun. 12, 2018 for EP Application No. 16749938.3, 7 pages.

European Patent Office Communication pursuant to Article 94(3) EPC for Application No. 16749938.3, dated Apr. 5, 2019, 6 pages.

European Patent Office Communication pursuant to Article 94(3) EPC for Application No. EP16749938.3, dated Nov. 14, 2019, 4 pages.

International Search Report and Written Opinion issued in connection with corresponding application No. PCT/US2016/017689, dated Feb. 12, 2016 (10 pages).

Notice of Allowance dated May 22, 2019 for U.S. Appl. No. 16/215,975 (pp. 1-11).

Notice of Allowance dated Sep. 15, 2020 for U.S. Appl. No. 16/439,431 (pp. 1-14).

Notice of Allowance dated Aug. 10, 2018 for U.S. Appl. No. 15/864,835 (pp. 1-7).

Office Action dated May 31, 2018 for U.S. Appl. No. 15/864,835 (pp. 1-6).

Singapore Supplementary Examination Report dated May 30, 2018 for SG Application No. 11201705566V, 5 pages.

* cited by examiner

MULTI-PARTY ENCRYPTION CUBE PROCESSING APPARATUSES, METHODS AND SYSTEMS

PRIORITY

This application is a continuation of U.S. patent application Ser. No. 16/439,431 filed Jun. 12, 2019, which is a continuation of U.S. patent application Ser. No. 16/215,975 filed Dec. 11, 2018, which is a continuation of U.S. patent application Ser. No. 15/864,835 filed Jan. 8, 2018, now U.S. Pat. No. 10,157,284, which is a continuation of U.S. patent application Ser. No. 15/042,405 filed Feb. 12, 2016, now U.S. Pat. No. 9,898,612, which claims priority to and the benefit of U.S. Provisional Patent Application No. 62/115,178, filed Feb. 12, 2015 and entitled "Multi-Party Encryption Cube Processing Apparatuses, Methods and Systems." The entire contents of the aforementioned applications are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to multi-party encryption approaches and more particularly, to MULTI-PARTY ENCRYPTION CUBE PROCESSING APPARATUSES, METHODS AND SYSTEMS or MPEC.

BACKGROUND

Secure multi-party computation approaches help create methods for parties to jointly process their data while keeping their respective data private from one another. Stated differently, these approaches allow multiple parties to jointly compute value(s) based on individually held secret pieces of information without revealing their respective confidential information to one another in the process.

This is useful, for example, when users, such as companies and firms, need to communicate and exchange ideas but need to keep their underlying data secured. For example, merchant data owners may be interested in pooling data together to perform transactional data analysis. The merchant data owners, in this example, can view a summarized version of the transactional data (or another form of aggregated data) and not the underlying data.

While secure multi-party computation approaches help generate such summarized data without surfacing the underlying confidential data of each party to others, today's approaches for securing the data exchange between parties, however, tend to be slow from a performance perspective.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

Computer-implemented systems and methods are disclosed herein, such as, for use within secure multi-party computations. For example, a system and method are disclosed for storing preferences. A data set is stored based on the preferences. A determination is made that processing the query involves performing an allowable operation on the data set based on the preferences.

As another example, a system and method are disclosed for storing, by one or more data processors, an operation preference and a cryptographic preference, which are both associated with a data set. The data set is stored based on the operation preference and the cryptographic preference. A query associated with at least the data set is analyzed. A determination is made that processing the query involves performing an allowable operation on the data set based on the operation preference. One or more cryptographic protocols are selected based on the first cryptographic preference. The one or more cryptographic protocols are used to perform the allowable operation on the data set.

DETAILED DESCRIPTION

Figure 1:
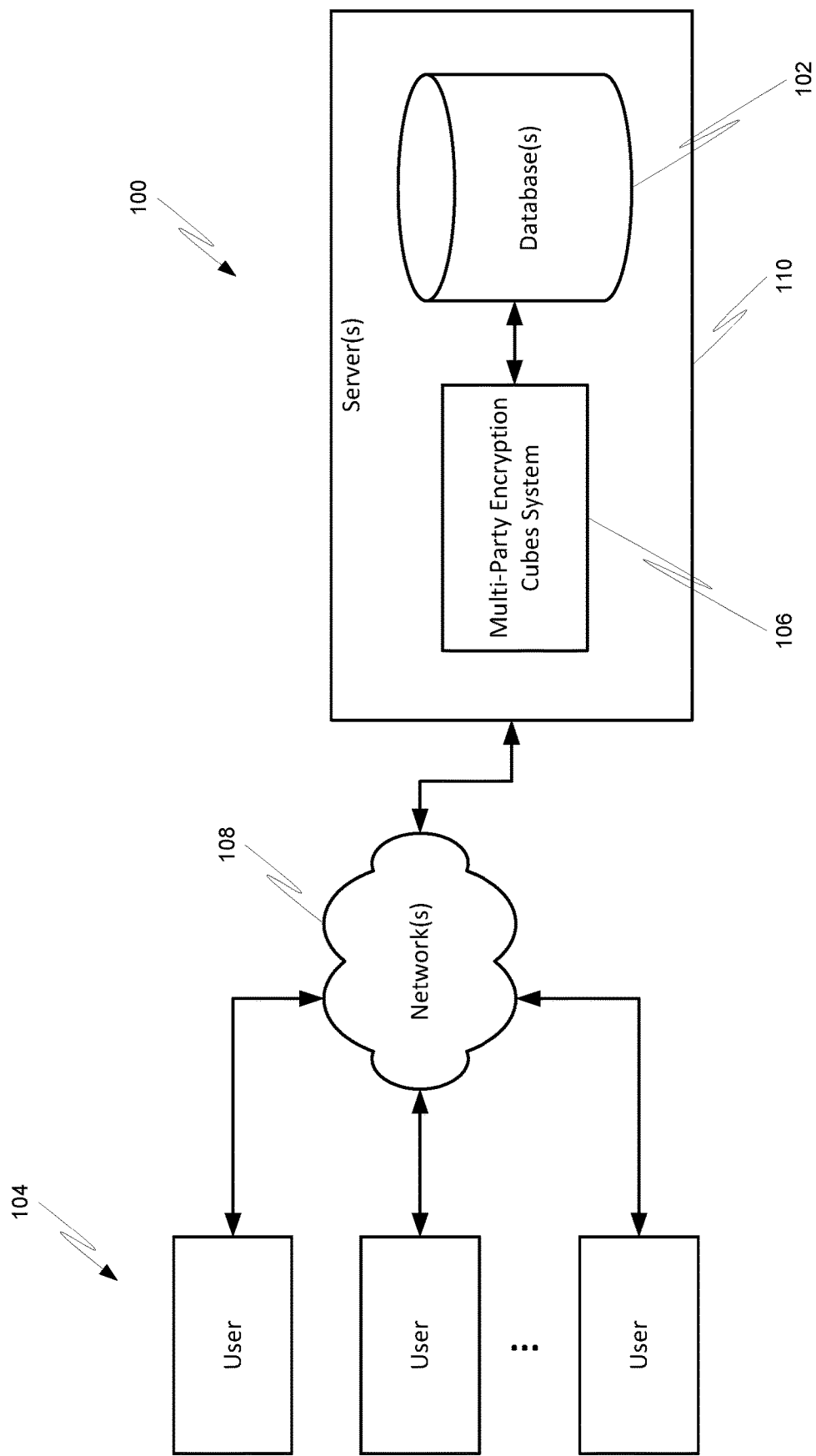
FIG. 1 is a block diagram depicting access by users of an MPEC.

FIG. 1 shows at 100 a block diagram illustrating example embodiments of the MPEC. In FIG. 1, one or more databases 102 are provided to store multiple data owners' information. The database(s) 102 can be in the form of a centralized database warehouse for storing transactional data from multiple merchants, payment service providers, etc.

Users 104 wishing to analyze the stored data can access data stored in the database(s) 102 through an MPEC 106. The MPEC 106 allows the analysis results to be "public" (e.g., surfaced to the requesting user), while the underlying data in the database(s) 102 remains confidential and secure even from other participating data owners.

The users 104 can interact directly or indirectly with the MPEC 106 through a number of ways, such as over one or more networks 108. Server(s) no accessible through the network(s) 108 can host the system 106. The database(s) 102 can store the data to be analyzed by the system 106 as well as any intermediate or final data generated by the system 106.

Figure 2:
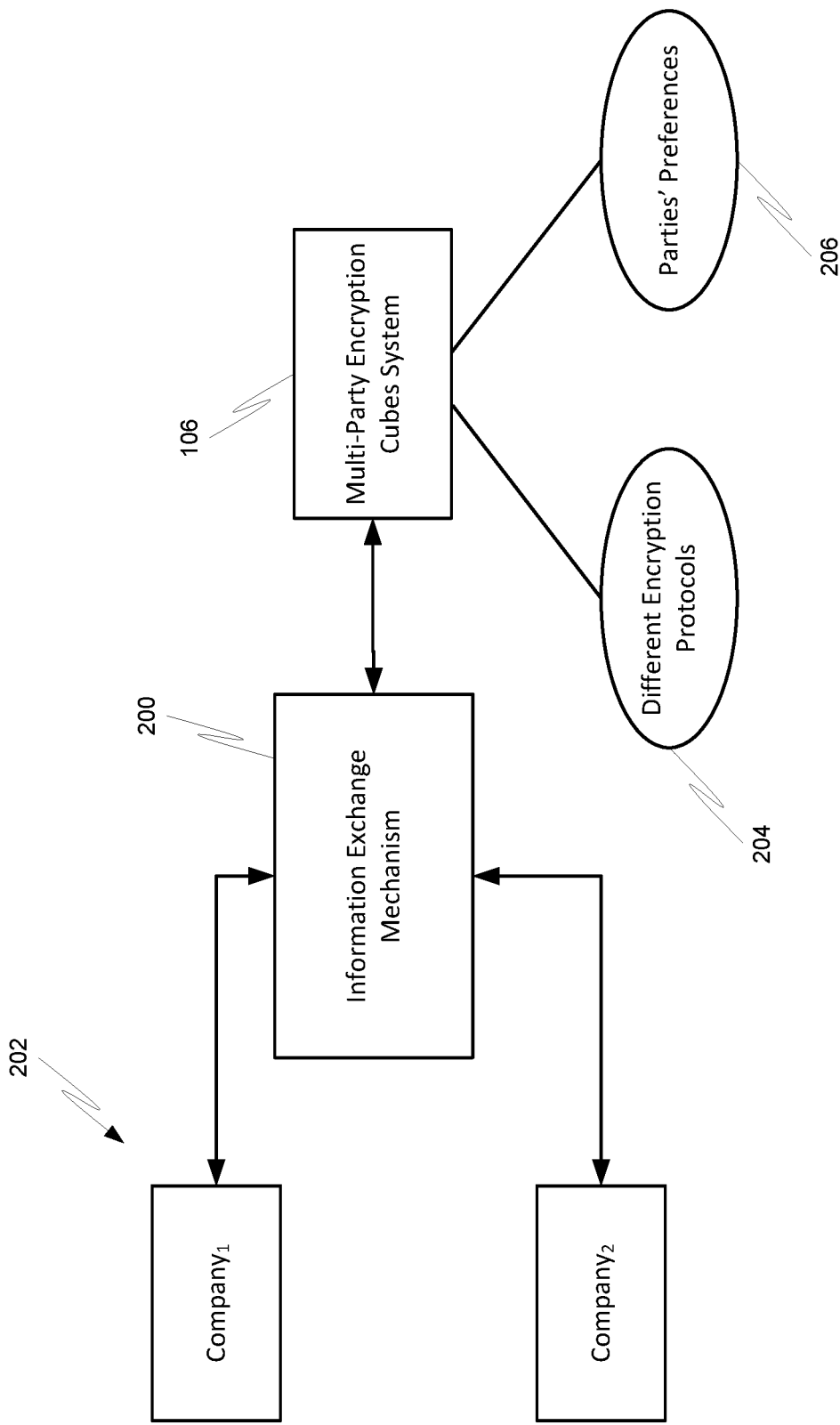
FIG. 2 is a block diagram depicting use of an MPEC for allowing two data owning users to access one another's data.

FIG. 2 shows an information exchange mechanism 200 for allowing two data owning users 202 to access one another's data via an MPEC 106. To accomplish this at least in part, the MPEC 106 provides data owners with encryption and data analysis tools as shown at 204. The system can provide predefined algorithms/protocols from which the owners can select to exchange information. For example, owners can select from a list of algorithms/protocols such as the Yao encryption method or other encryption techniques known in the field. (The technology of the Yao encryption method is discussed in U.S. Publication No. US 2014/0351104A1 entitled "Data Management Systems and Processing for Financial Risk Analysis" which is incorporated by reference herein for all purposes.)

Additionally, each data owner may specify how its data is to be handled. A data owner can do this by specifying party preferences 202 (e.g., configurations) to the MPEC 106. Owner-specific preferences can include each owner-specific data set having a defined set of allowed operations (e.g., retrieving, joining, etc.). Another preference, for example, can specify that each data operation can use multiple cryptographic algorithms/protocols.

The preferences are used in processing query requests. For example, the MPEC 106 determines whether the query involves performing an allowable operation on the owners' data based on a pre-specified operation preference. A cryptographic preference selects which one or more cryptographic protocols are to be used in performing the allowable operation on the data set. The query results are sent to the requester but at a level that maintains the confidentiality of other users' data.

Figure 3:
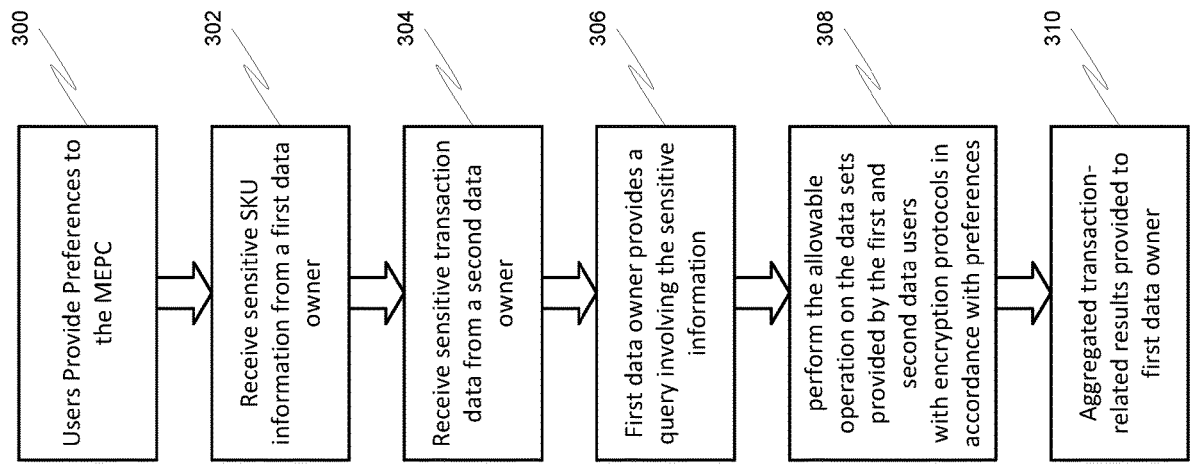
FIG. 3 is a flowchart depicting an operational scenario using an MPEC.

FIG. 3 depicts an example of an operational scenario involving the MPEC. The operational scenario involves an encrypted database where multiple data owners can ask questions from the database and then derive aggregate statistics responses or a summarized list based upon the underlying sensitive data contained in the database. In this scenario, the data owners do not know specifically what was actually contained within the database.

In the example, users provide at 300 preferences for use by the MPEC in performing its operations. The preferences include allowable operations and preferred encryption protocols. It should be understood that in other operational scenarios preferences may include only allowable operations or only preferred encryption protocols or combinations thereof.

At 302 and 304, sensitive information is received from multiple data owners. In this operational scenario, the sensitive information includes SKU (stock keeping unit) information associated with the merchant. SKU information can contain identification for distinct products and services that can be purchased in a merchant's business. The sensitive information also includes in this example a payment processing company's transactional data.

At 306, one of the data owners provides a query involving the sensitive information. At 308, the MPEC performs the allowable operation on the data sets provided by the first and second data users with encryption protocols in accordance with the specified preferences. The aggregated results are then provided to the first data owner.

For example, a merchant data owner can provide SKU data and another data owner can provide the transactional data. The MPEC can join the two pieces of data in an encrypted space and provide aggregated type information, such as what was the maximum amount line item-wise. A cube can be created that allows the information to be encrypted using the selected encryption protocols at different levels within the cube.

Figure 4:
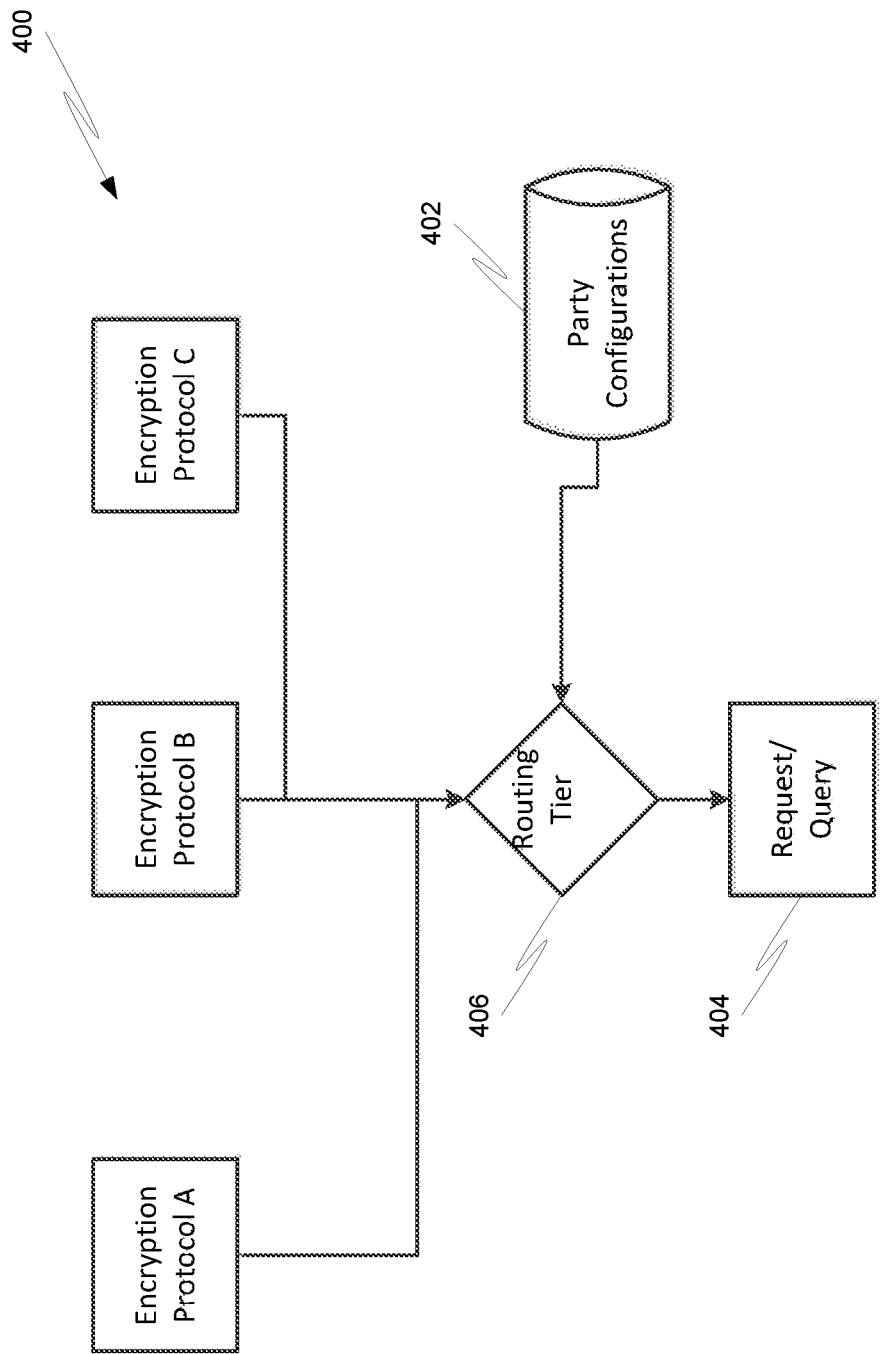
FIGS. 4-6 are block diagrams depicting various processing flows of an MPEC.

FIG. 4 depicts software computer components in an example embodiment of the MPEC. Multiple encryption protocols 400 are available for utilization within the MPEC. The MPEC selects those encryption protocols 400 to handle a request/query 404 based upon the stored preferences 402. When the cubes are first set up for a party, the party selects what set of operations can be performed, thereby restricting what cubes can be generated. This results in providing greater security for data usage. Further, data owners can provide their own encryption protocols for use within the MPEC. This can occur if the data owner has come to trust a particular encryption protocol and that protocol is currently not present within the MPEC.

With the preferences, the MPEC employs dedicated encryption algorithms for a specific task. For example, computations across join-type data may be performed by a Homomorphic-like method or Yao's algorithm. This allows parties to decide on the final protocol and provides greater security by creating a heterogeneous environment in deployment. More specifically, for a request the platform knows the configuration of each party and employs the proper protocol to extract the data.

The MPEC can further include functionality to operate as a routing tier 406. The routing tier 406 redirects the request/query 404 to those software and database components that should be involved in processing the request/query 404.

Figure 5:
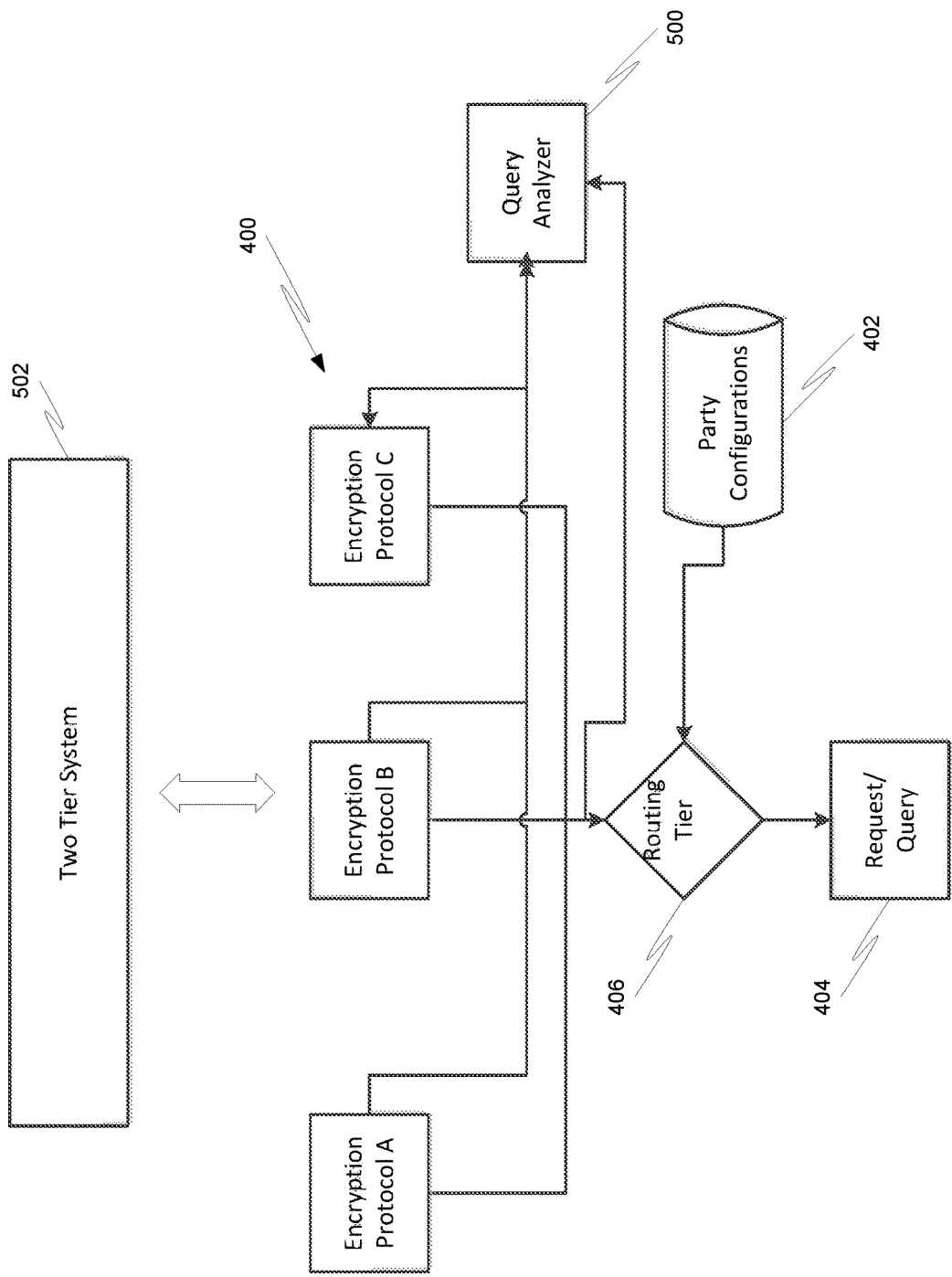

FIG. 5 illustrates that a query analyzer 500 analyzes the query to determine the optimal way for processing the query. This can involve a two tier system 502 for processing the query.

Figure 6:
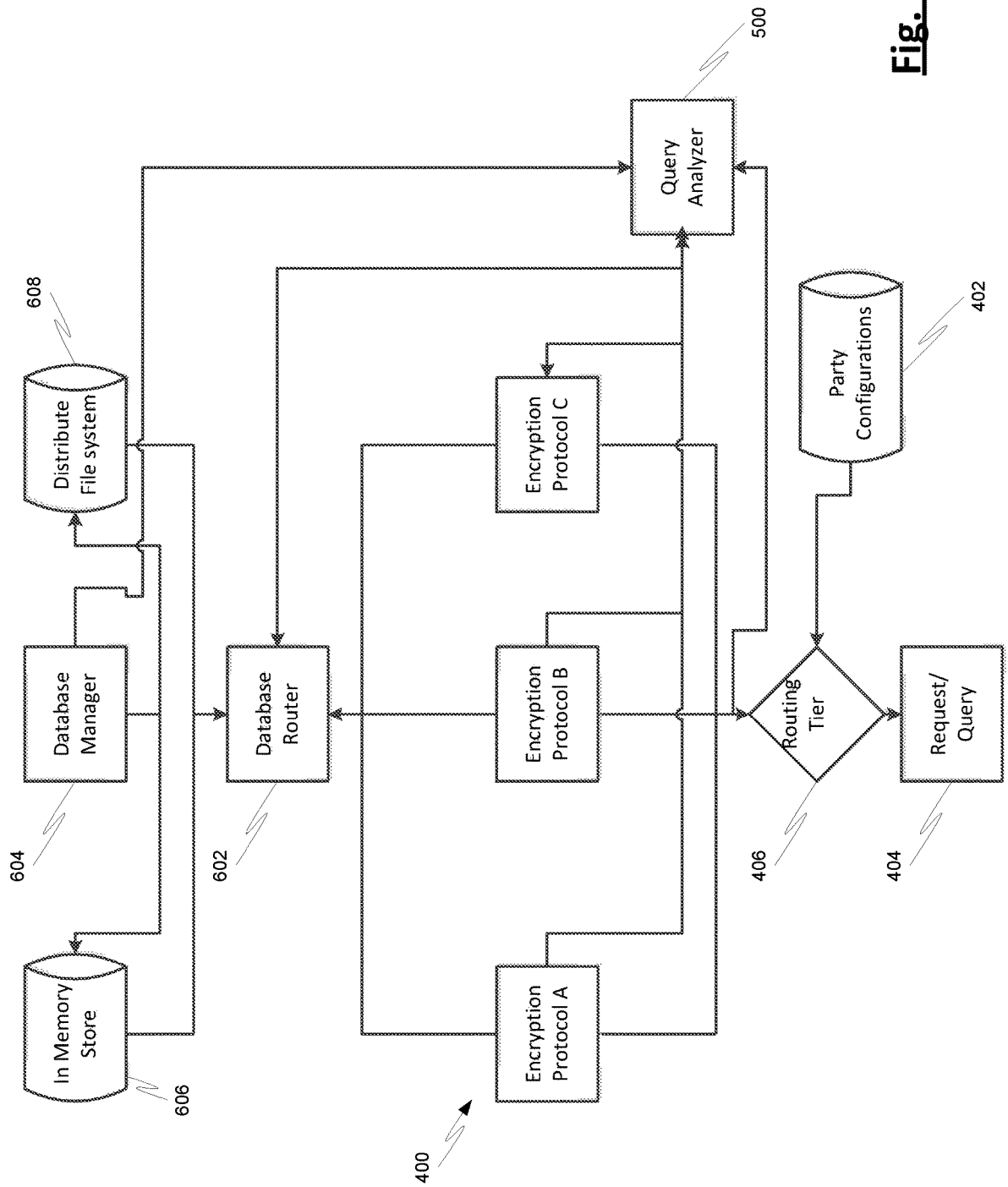

As an example of a two tier processing system, FIG. 6 illustrates additional optimal processing capability by using a database router 602 and database manager 604 that allows smaller type query processing to use in-memory storage 606 for performance gains or a file system 608 for other type processing of larger data sets. In this way, an intelligence layer for diagnostics is provided for the cube.

More specifically, methods which require large in-memory usage for each data element can use distributed files system like Hadoop. Methods with smaller requirements can use in-memory databases. Based on volumes and types of queries, the MPEC can move data in and out of memory automatically to enhance performance. For certain protocols, data may be split and algorithms adapted to enhance performance on the fly. For example, if optimization is required the system can choose an action based on set actions for the involved algorithm. If the algorithm allows splitting functionality into sub cubes, the system will choose this action. If this is not available then more memory may be allocated.

The query analyzer in this example examines, the data usages, algorithm and query complexity to determine if a re-optimization should be performed. For example, this can include re-encrypting the space based upon usage history. Additionally, the entire cube may not need to be encrypted, only those parts which need to be secure in providing the results to the requestor.

It should be understood that other approaches can be used in addition to in-memory storage, such as a graph database which uses graph structures for semantic queries with nodes, edges, and properties to represent and store data. In this way, the MPEC allows complex data structures, like a graph to be expressed using multiple encryption techniques.

As a further illustration of the wide scope of the systems and methods disclosed herein, an MPEC can be configured with one or more of the approaches disclosed herein to provide a framework for a collection of dedicated encryption algorithms enabling a broad spectrum of use cases while providing optimal performance.

Figure 7:
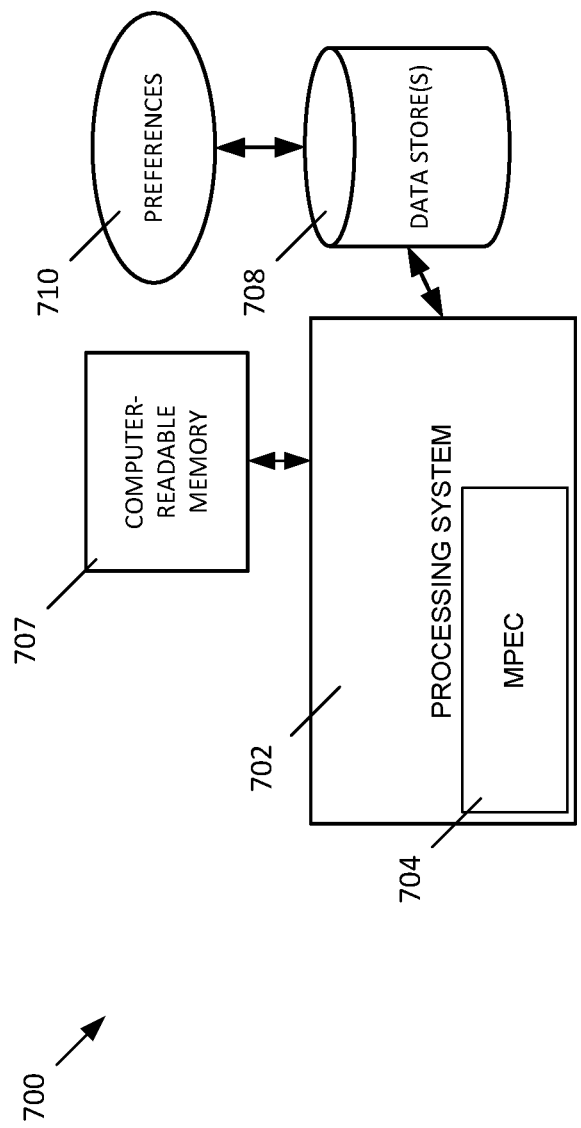
FIGS. 7-8 depict example computer and software components that can be used with the operations described herein.
Figure 8:
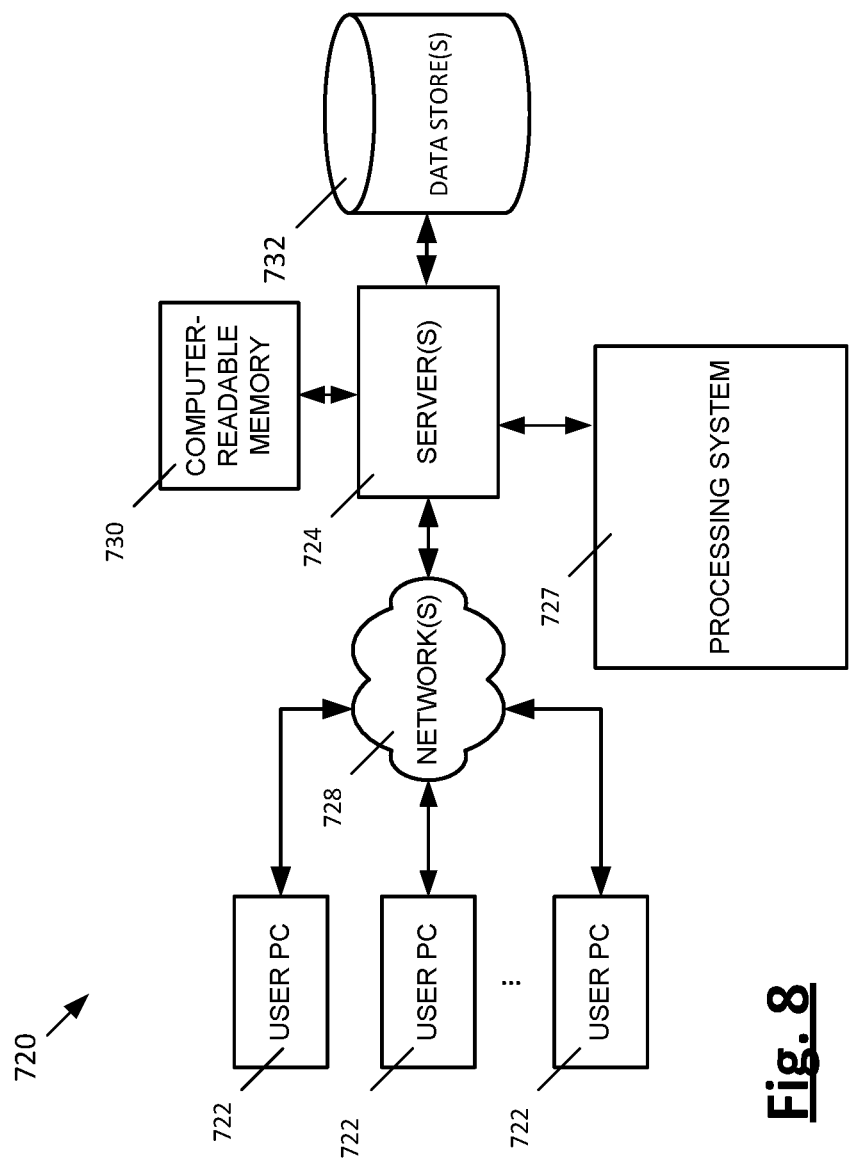

FIGS. 7 and 8 depict example systems for use with the operations disclosed herein. For example, FIG. 7 depicts an exemplary system 700 that includes a computer architecture where a processing system 702 (e.g., one or more computer processors located in a given computer or in multiple computers that may be separate and distinct from one another) includes an MPEC 704 being executed on the processing system 702. The processing system 702 has access to a computer-readable memory 707 in addition to one or more data stores 708. The one or more data stores 708 may include user preferences 710. The processing system 702 may be a distributed parallel computing environment, which may be used to handle very large-scale data sets.

FIG. 8 depicts a system 720 that includes a client-server architecture. One or more user PCs 722 access one or more servers 724 running an MPEC system 737 on a processing system 727 via one or more networks 728. The one or more servers 724 may access a computer-readable memory 730 as well as one or more data stores 732.

In FIGS. 7 and 8, computer readable memories (e.g., at 707) or data stores (e.g., at 708) may include one or more data structures for storing and associating various data used in the example systems. For example, a data structure stored in any of the aforementioned locations may be used to store data including user preferences, etc.

Each of the element managers, real-time data buffer, conveyors, file input processor, database index shared access memory loader, reference data buffer and data managers may include a software application stored in one or more of the disk drives connected to the disk controller, the ROM and/or the RAM. The processor may access one or more components as required.

A display interface may permit information from the bus to be displayed on a display in audio, graphic, or alphanumeric format. Communication with external devices may optionally occur using various communication ports.

In addition to these computer-type components, the hardware may also include data input devices, such as a keyboard, or other input device, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure.

The invention claimed is:

1. A method for use in database operations on data sets from multiple parties such that an individual data set is visible only to the party that provided the data set, the method comprising:
   receiving a query associated with one or more data sets comprising data provided by one or more parties;
   analyzing an operation preference for the one or more data sets to determine that the query involves allowed database operations for elements of the data set involved in the query;
   in response to determining that the query involves an allowable database operation,
   selecting one or more encryption protocols according to the operation preference for the elements of the data set involved in the query; and
   using the one or more encryption protocols to perform the allowable operation on the data set involved in the query, with a summarized version of a transactional data analysis provided to at least the requester while keeping data from individual parties that contributed to the data set private from one another.

2. The method of claim 1, further comprising storing the one or more data sets in a centralized database warehouse, wherein the one or more data sets include transactional data from multiple merchants and payment service providers.

3. The method of claim 1, wherein a query that involves a non-allowable database operation prohibits execution of the query.

4. The method of claim 1, further comprising analyzing the query to determine a memory requirement for the query.

5. The method of claim 4, wherein a first memory requirement uses an in-memory storage.

6. The method of claim 4, wherein a second memory requirement uses a file system when the memory requirement exceeds the in-memory storage.

7. A system for use in database operations on data sets from multiple parties such that an individual data set is visible only to the party that provided the data set comprising:
   a memory; and
   one or more processors disposed in communication with the memory and configured to issue processing instructions stored in the memory to:
   receive a query associated with one or more data sets comprising data provided by one or more parties;
   analyze an operation preference for the one or more data sets to determine that the query involves allowed database operations for elements of the data set involved in the query;
   in response to determining that the query involves an allowable database operation,
   select one or more encryption protocols according to the operation preference for the elements of the data set involved in the query; and use the one or more encryption protocols to perform the allowable operation on the data set involved in the query, with a summarized version of a transactional data analysis provided to at least the requester while keeping data from individual parties that contributed to the data set private from one another.

8. The system of claim 7, wherein the one or more processors are further configured to:
store the one or more data sets in a centralized database warehouse, wherein the one or more data sets include transactional data from multiple merchants and payment service providers.

9. The system of claim 7, wherein a query that involves a non-allowable database operation prohibits execution of the query.

10. The system of claim 7, wherein the one or more processors are further configured to:
analyze the query to determine a memory requirement for the query.

11. The system of claim 10, wherein a first memory requirement uses an in-memory storage.

12. The system of claim 10, wherein a second memory requirement uses a file system when the memory requirement exceeds the in-memory storage.

13. A processor-readable non-transitory medium for use in database operations on data sets from multiple parties such that an individual data set is visible only to the party that provided the data set, the processor-readable non-transitory medium storing processor-issuable instructions configured to cause a processor to:
receive a query associated with one or more data sets comprising data provided by one or more parties;
analyze an operation preference for the one or more data sets to determine that the query involves allowed database operations for elements of the data set involved in the query;
in response to determining that the query involves an allowable database operation,
select one or more encryption protocols according to the operation preference for the elements of the data set involved in the query; and
use the one or more encryption protocols to perform the allowable operation on the data set involved in the query, with a summarized version of a transactional data analysis provided to at least the requester while keeping data from individual parties that contributed to the data set private from one another.

14. The processor-readable non-transitory medium of claim 13, wherein the processor-issuable instructions are further configured to cause a processor to:
store the one or more data sets in a centralized database warehouse, wherein the one or more data sets include transactional data from multiple merchants and payment service providers.

15. The processor-readable non-transitory medium of claim 13, wherein a query that involves a non-allowable database operation prohibits execution of the query.

16. The processor-readable non-transitory medium of claim 13, wherein the processor-issuable instructions are further configured to cause a processor to:
analyze the query to determine a memory requirement for the query.

17. The processor-readable non-transitory medium of claim 16, wherein a first memory requirement uses an in-memory storage.

18. The processor-readable non-transitory medium of claim 16, wherein a second memory requirement uses a file system when the memory requirement exceeds the in-memory storage.

\* \* \* \* \*